Aug. 30, 1966　　　S. K. HAMBLING ETAL　　　3,269,273
FLUID PRESSURE OPERATED BOOSTERS
Filed Feb. 12, 1964　　　9 Sheets-Sheet 1

INVENTORS
Harold Fineman + Stewart Kevern Hambling
BY Scrivener Parker Scrivener + Clarke

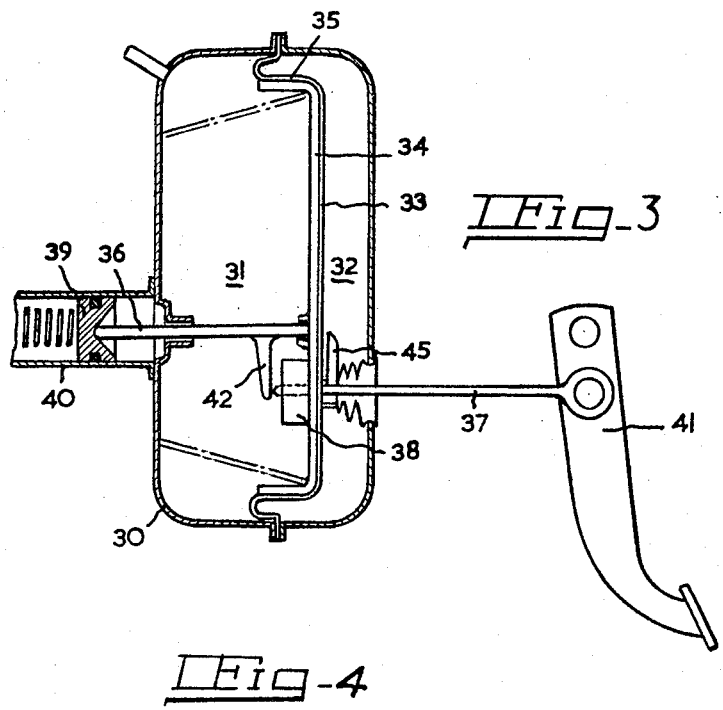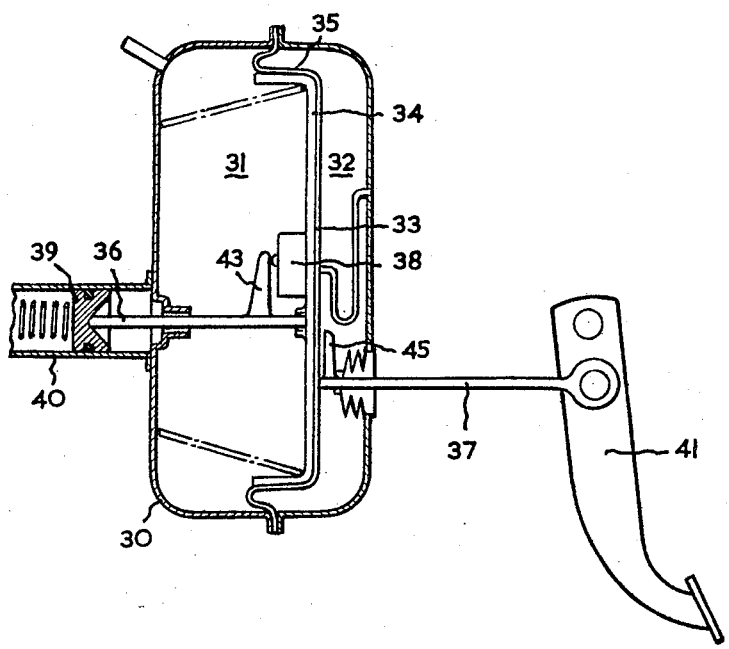

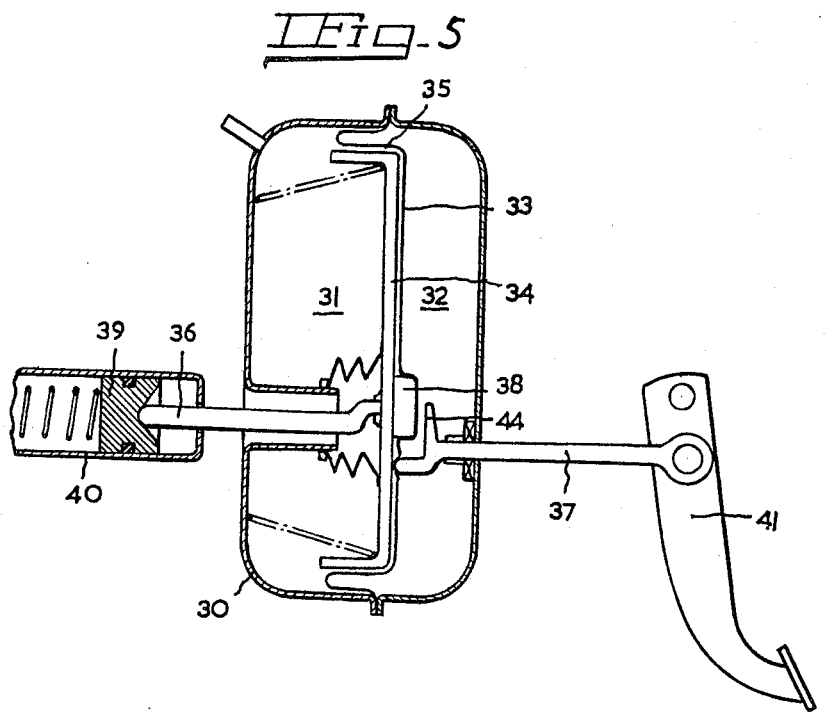

Aug. 30, 1966  S. K. HAMBLING ETAL  3,269,273
FLUID PRESSURE OPERATED BOOSTERS
Filed Feb. 12, 1964  9 Sheets-Sheet 4
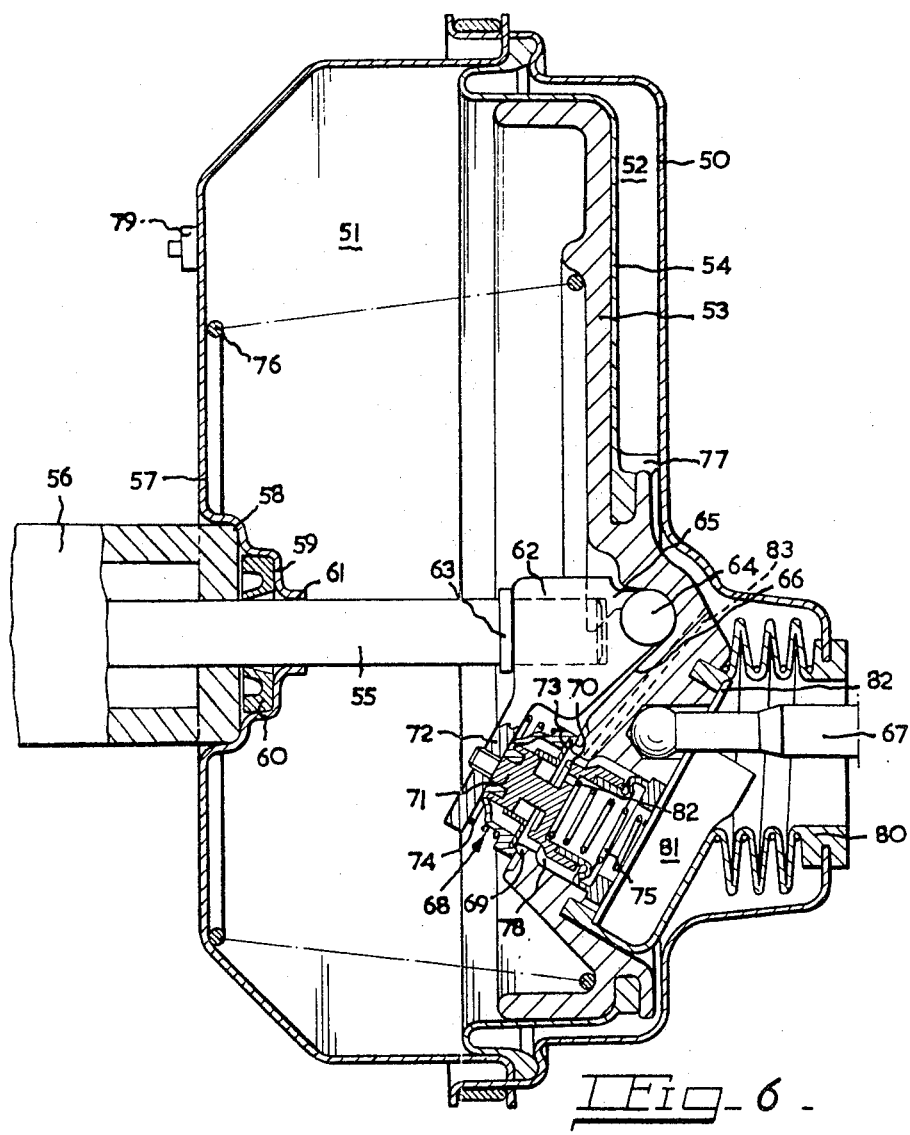
Fig_6_
INVENTORS
Harold Fineman & Stewart Kevern Hambling
BY Scrivener Parker Scrivener & Clarke

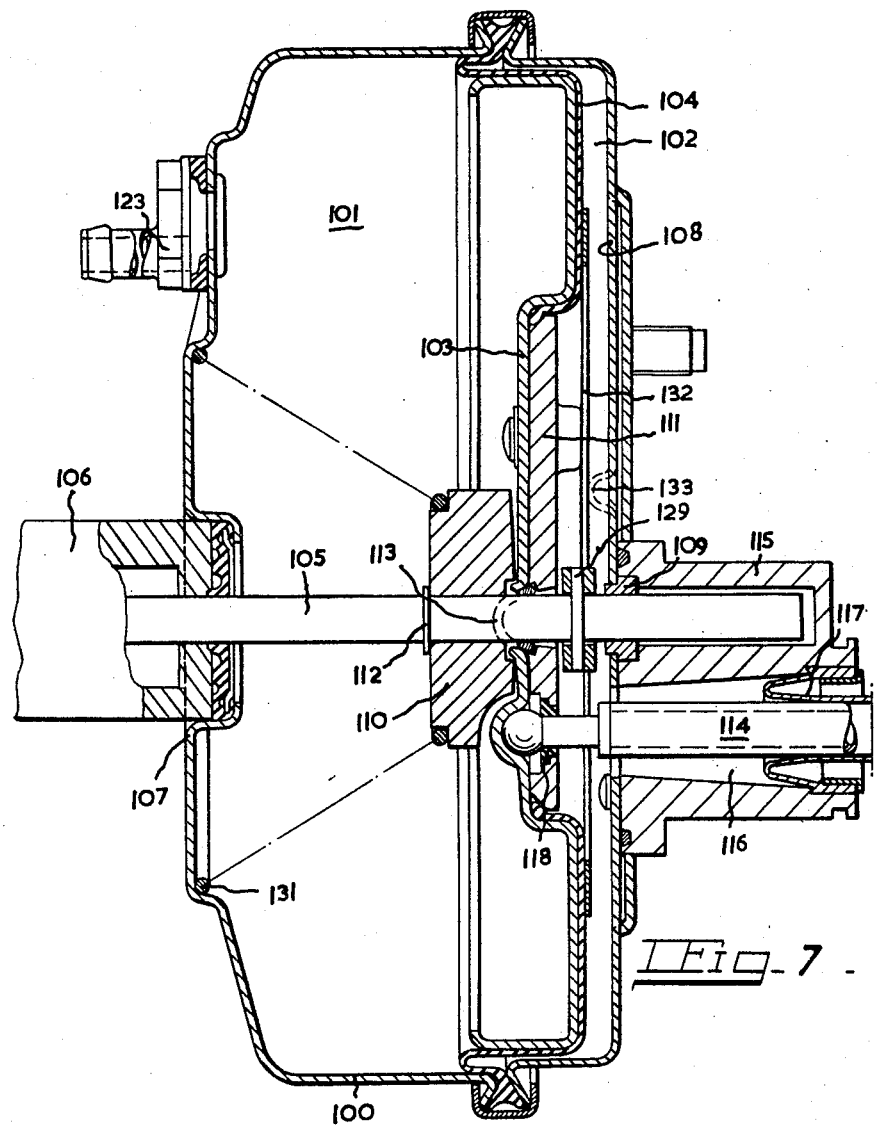

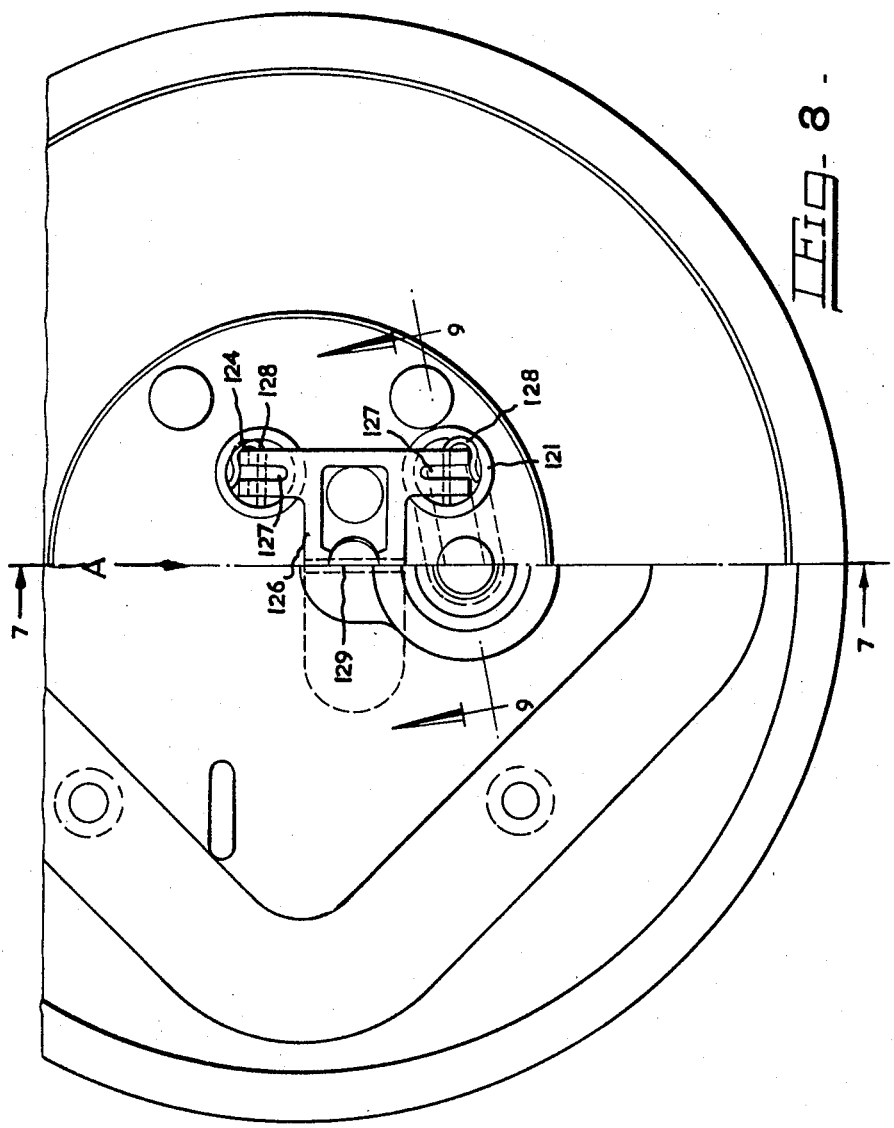

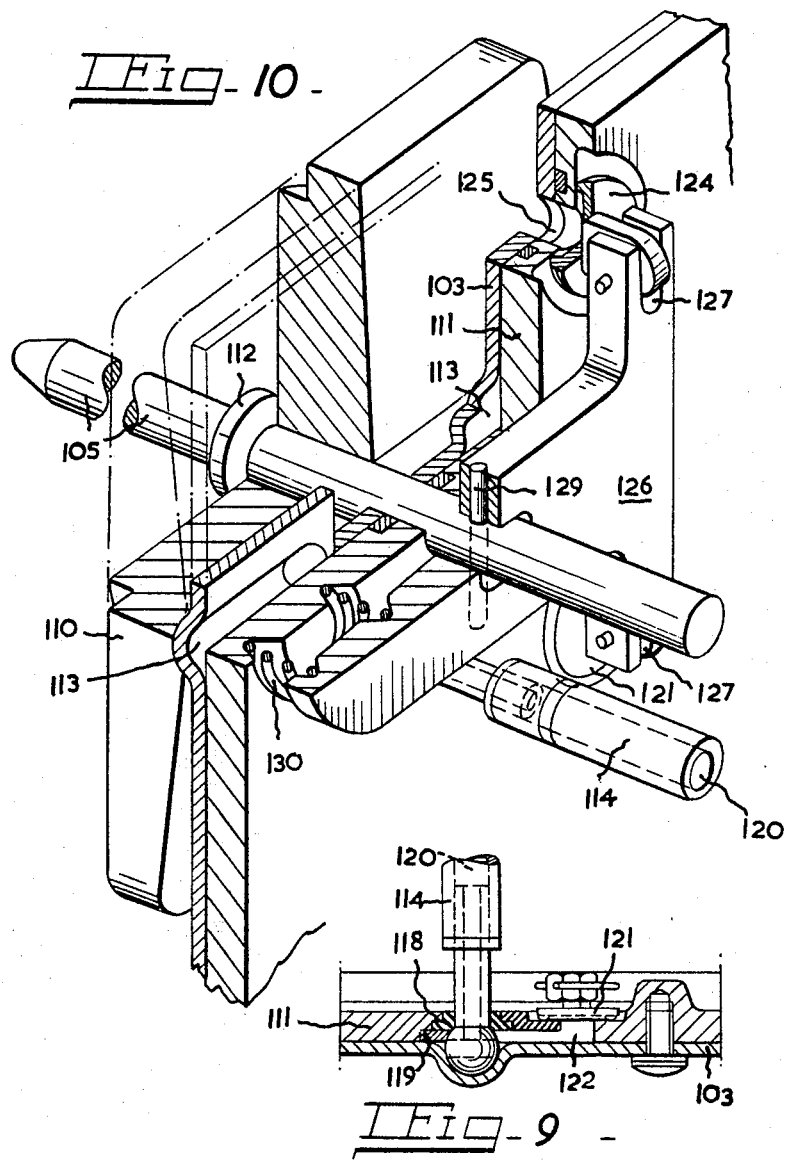

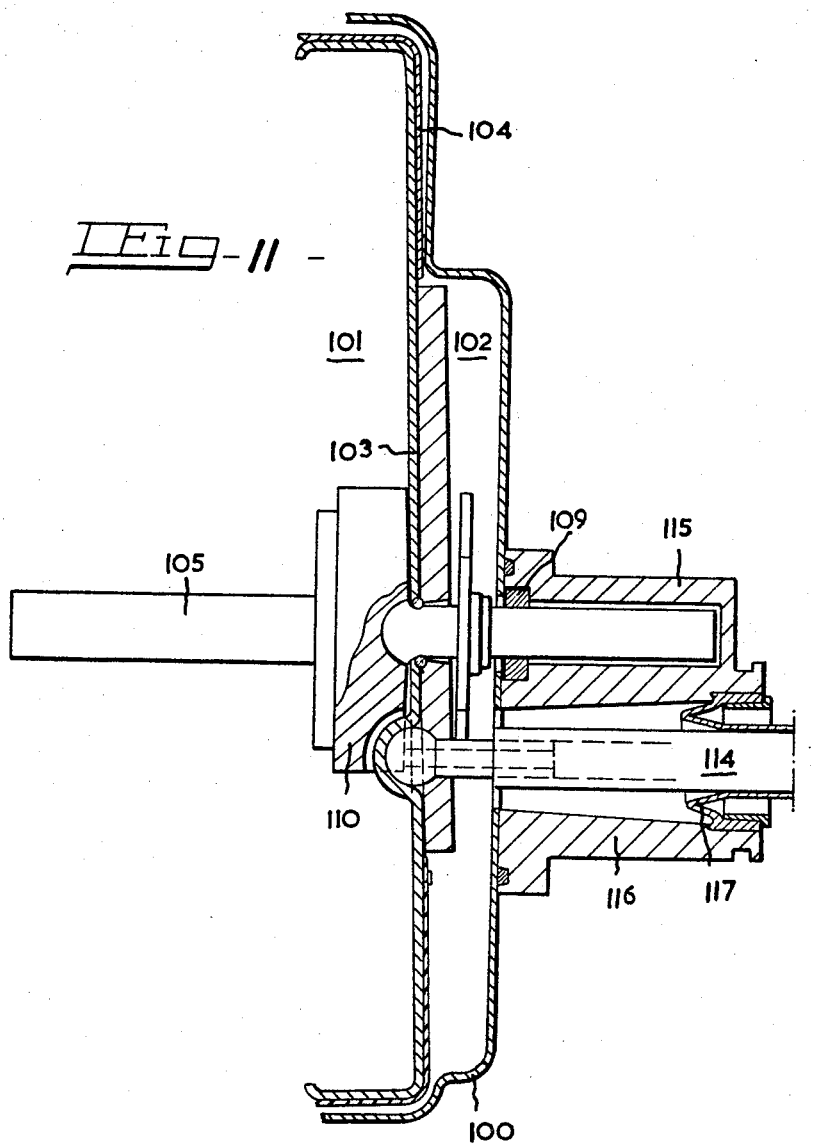

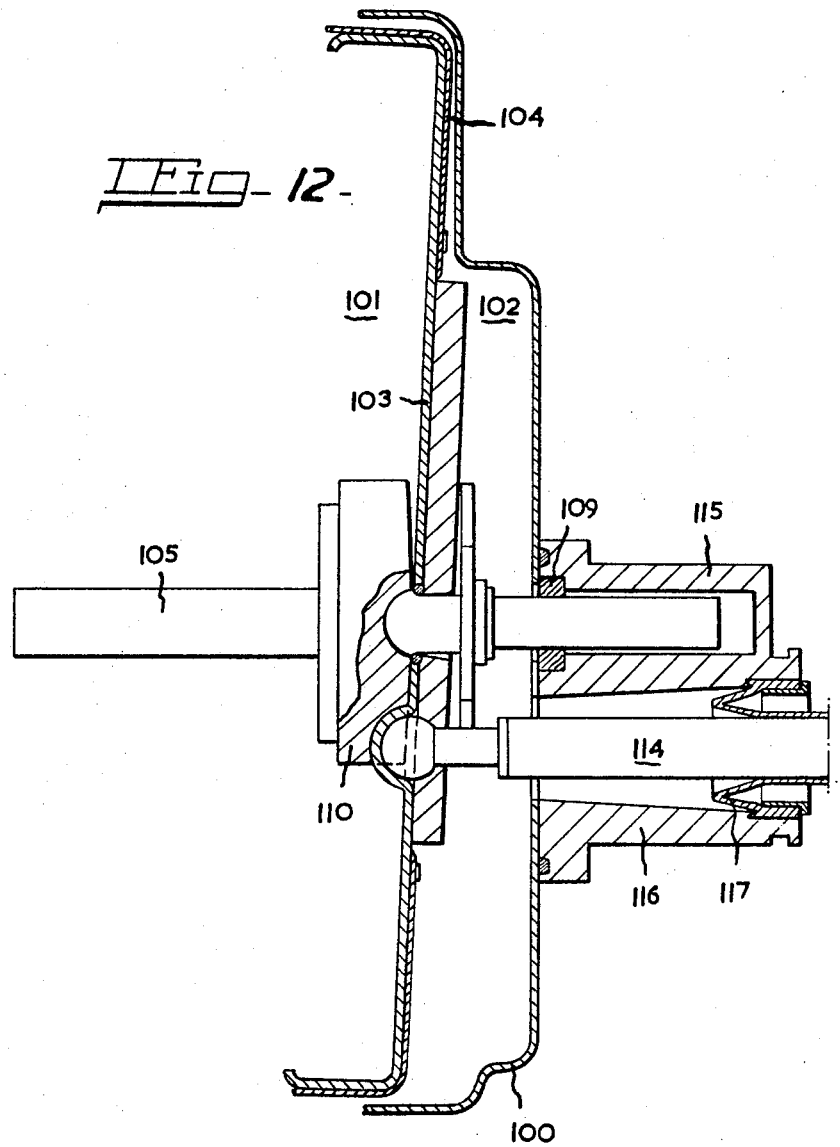

United States Patent Office

3,269,273
Patented August 30, 1966

3,269,273
FLUID PRESSURE OPERATED BOOSTERS
Stewart Kevern Hambling, Staffordshire, and Harold Fineman, Birmingham, England, assignors to Girling Limited, Birmingham, England, a British company
Filed Feb. 12, 1964, Ser. No. 344,477
Claims priority, application Great Britain, Feb. 19, 1963, 6,575/63
20 Claims. (Cl. 91—376)

This invention relates to improvements in fluid-pressure operated boosters for augmenting an input force, deriving their power from a fluid pressure differential. Such boosters are used, for example, in the braking systems of vehicles, the fluid being air and the pressure difference being that between atmosphere and a source of vacuum such as the induction manifold of the engine of the vehicle or between a source of compressed air and atmosphere.

According to our invention, in a fluid-pressure booster comprising a force input member acting through a lever on a force output member, a movable wall acting on the lever to augment the input force and mounted in a cylinder or casing in which the pressure differential across the wall is developed, and a valve controlling the development of the pressure differential in response to movement of the lever, the lever is mounted within the cylinder or casing.

Preferably it is mounted on the movable wall or alternatively according to a further feature of the invention, the lever is formed by the movable wall itself, or by a part of it.

The valve is mounted on the movable wall in either case. It can be of known construction, arranged in the rest position of the booster, to allow communication between the two sides of the movable wall. In operation the valve first cuts off this communication and then puts one side of the wall in communication with a source of pressure, for example atmosphere or vacuum, to produce movement of the wall in the required direction.

The mounting of the lever on the movable wall or its formation by the movable wall results in a neat and compact booster unit with simply an input member, an output member and a connection for the source of pressure or vacuum. Previously this compact result was only achieved with boosters in which the input and output members, the valve and the movable wall were all co-axial, but such an arrangement is less flexible than that now proposed, employing levers, and it severly limits the form of the valve.

Several forms of booster in accordance with our invention are shown in the accompanying drawings in which:

FIGURE 3 is a diagrammatic view of another form of booster;

FIGURE 4 is a view similar to FIGURE 3 but showing a modification;

FIGURE 5 is a modification of the booster shown in FIGURE 3;

FIGURE 6 is a longitudinal section similar to FIGURE 3 but showing the booster in one practical form;

FIGURE 7 is a longitudinal section on the line 7—7 of FIGURE 8 and showing in another practical form the booster illustrated diagrammatically in FIGURE 3;

FIGURE 8 is an end elevation partly in section of the booster shown in FIGURE 7 with the rear end wall of the booster housing removed;

FIGURE 9 is a section on the line 9—9 of FIGURE 8;

FIGURE 10 is a perspective view on arrow "A" in FIGURE 7;

FIGURE 11 is a modification of the booster shown in FIGURE 7 in the inoperative position or de-energised position; and FIGURE 12 is a view similar to FIGURE 11 but showing the booster in the energising position.

Figure 1:
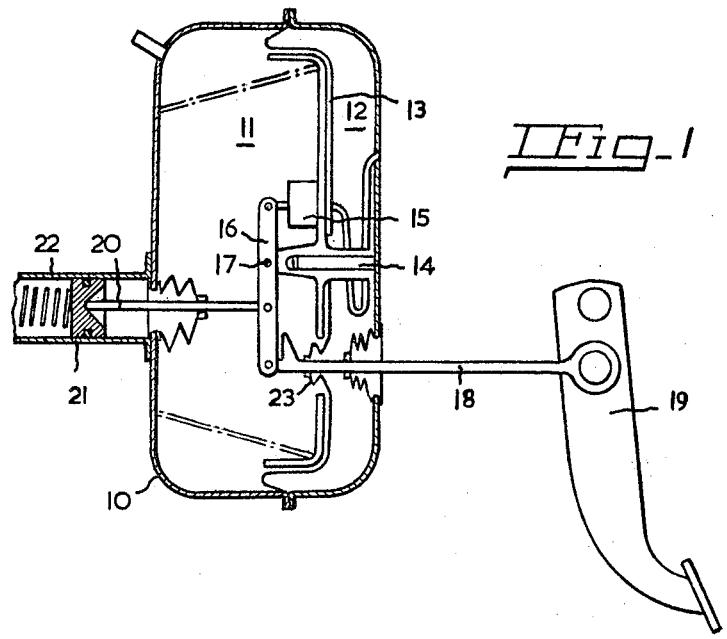
FIGURE 1 is a diagrammatic view of one form of booster.
Figure 2:
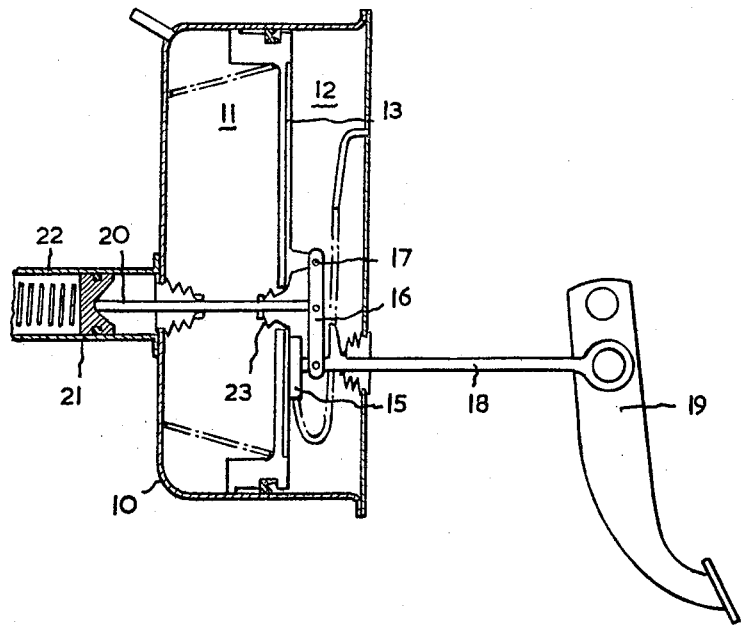
FIGURE 2 is a modification of the booster shown in FIGURE 1.

In the booster illustrated in FIGURES 1 and 2, 10 is a housing or cylinder of the booster which is divided into front and rear chambers 11 and 12 by a movable wall 13. The movable wall may comprise a piston working in the cylinder (FIGURE 2) or as illustrated in FIGURE 1 the movable wall comprises a piston and rolling diaphragm assembly and the movable wall is guided for axial movement in the housing on a spigot 14 extending forward from the rear wall of the housing.

The front chamber 11 is connected to a source of vacuum and the rear chamber 12 is in communication with the front chamber and vacuum through a valve 15 mounted on one face of the movable wall 13. The valve is operated by a lever 16 connected at one point to a pivot 17 at the centre of pressure of the movable wall 13 and an input member or rod 18 is connected at one end to another point on the lever 16 and at the other end to a pedal 19. Between the pivot 17 and its connection with input member 18, the lever is pivotally connected to an output member 20 which usually forms the piston rod for a piston 21 of a master cylinder 22.

The valve 15 can be actuated by any convenient point on the lever 16. As shown in FIGURE 1 it is engaged by an extension of the lever 16 beyond the pivot 17 on the movable wall and as shown in FIGURE 2 it is engaged directly by the input member or rod 18.

When the lever 16 is mounted on the forward face of the movable wall 13 (FIGURE 1), the input member or rod 18 extends through an aperture in the movable wall 13 and when the lever is mounted on the rearward face as shown in FIGURE 2 the output member or piston rod 20 extends through the movable wall 13.

In either case the aperture is sealed by a sliding seal or preferably as illustrated, by flexible bellows 23.

When the pedal 19 is depressed, lever 16 is moved angularly about pivot 17 on the movable wall 13 to actuate the valve 15 which first isolates chamber 12 by cutting off communication with chamber 11 and then placing it in communication with atmospheric air and the pressure differential so produced acts on the movable wall 13 to move it forward actuating the output member 20 through the lever 16.

In another arrangement the movable wall or a part of it is adapted to tilt thus forming the lever and in the constructions shown in FIGURES 3, 4 and 5, 30 is a housing or cylinder which is divided into front and rear chambers 31 and 32 by a movable wall 33 which is formed by a rigid piston 34 having a substantial clearance between its peripheral edge and the peripheral wall of the housing to which the piston is connected by a rolling diaphragm 35 forming a seal.

An output member 36 engages the piston 34 at an intermediate point on a line joining the centre of pressure of the piston 34 to the line of action of an input member 37, the output member forming the piston rod for operating a piston 39 of a master cylinder 40.

The front chamber 31 is connected to a source of vacuum and the rear chamber 32 is in communication with the front chamber and vacuum through a valve 38 mounted on one face of the movable wall.

As illustrated in FIGURE 3 the valve 38 is mounted on the front face of the movable wall 33 on the line of action of the input member 37 which upon operation by a pedal or the like 41 causes the movable wall 33 to tilt about its point of engagement with the output member 36 and a lateral arm or projection 42 on the output member operates the valve 38 to energise the booster thus subjecting the movable wall to a differential pressure which moves it forward to actuate the output member.

Alternatively as illustrated in FIGURE 4, the valve 38 can be mounted on the opposite side of the output member 37 and actuated by a lateral arm or projection 43 on the output member.

In another arrangement shown in FIGURE 5, the valve 38 is mounted on the rearward face of the movable wall 33 and operated by a lateral arm or projection 44 on the input member 37.

In the embodiments of FIGURES 3 and 4, a lateral arm or stop 45 may be provided on the input member 37 to limit the degree of tilting of the piston 34 in the event of failure of the source of power and thereby to ensure the transmission of the input force to the output member 36. This causes the input member 37 or output member 36 to be subjected to a substantial bending moment and where the members are in the form of rods this may lead to difficulties which can be at least partially overcome by offsetting the point of engagement of each member with the piston from the general line of each member as shown particularly in FIGURE 5. There is then a certain amount of bending moment in the rod even in normal operation but the maximum bending moment on failure of the power source is correspondingly reduced.

One practical form of the booster illustrated diagrammatically in FIGURE 3 is shown in FIGURE 6 in which 50 is a housing or cylinder of the booster which is divided into front and rear chambers 51 and 52 by a movable wall which is free to tilt and which is formed by a rigid piston 53 having a substantial clearance between its peripheral edge and the peripheral wall of the housing to which the piston 53 is connected by a rolling diaphragm 54 forming a seal. An output member 55 which may be the rod actuating a piston of a master cylinder 56 is guided for axial movement in the front wall 57 of the booster and preferably the front wall is formed with two concentric annular recesses 58 and 59 of which the outer recess 58 receives the end of the master cylinder 56. The inner recess 59 of less diameter than the outer recess, receives an annular seal 60 through which the rod 55 passes and against which the end of the master cylinder engages thus ensuring that the interior of the housing or cylinder 50 is sealed from the atmosphere and the interior of the master cylinder 56. The inner recess 59 at its free end is formed with an inwardly extending annular flange 61 which forms a bearing and guide surface for the rod thus dispensing with the relatively expensive bronze or equivalent bearing normally required. The recesses 58 and 59 and the flange 61 may conveniently be formed by a single pressing operation.

The rear end of the output member 55 is an interference fit in a fitting 62 and locked against relative angular movement by a collar 63. At its inner end the fitting carries a transverse pin 64 which is located between two downwardly projecting portions 65 and 66 on the piston 53 and which provide a loose or rocking engagement for the fitting at a point offset radially from the axis of the booster and which ensure that no transverse movement of the fitting 62 and member 55 can take place.

An input member 67 which may be a rod actuated by a pedal has a rocking engagement with the rear face of the piston 53 at a point spaced radially outwards from the point of engagement of the fitting 62 on the output member 55 with the piston 53 and the two points of engagement are substantially in radial alignment.

A valve assembly 68 is located in an opening in the piston 53 with its axis at an acute angle to the axis of the piston on the radially outer side of the point of engagement of the input member 67 with the piston. The valve assembly incorporates two concentric annular seatings 69 and 70, of which the outer seating 69 is integral with the piston and the inner seating 70 is carried by a member 71 secured to a lug or spade like portion 72 extending radially and forwardly from the fitting 62 attached to the output rod 55.

Also carried by member 71 is a movable valve member 73 which engages with both seatings 69 and 70, the valve member being loaded by a spring 74 which urges it towards the seatings and the member is loaded by an oppositely acting spring 75.

The piston 53 is loaded by a return spring 76 which, in the inoperative position of the booster, holds spaced abutments 77 on the rear face of the piston in engagement with the fixed rear end wall of the booster.

In this position the lug 72 on the fitting 62 holds the valve member 73 clear of the outer valve seating 69 and chambers 51 and 52 in the booster are in communication through an annular chamber 78 between the seatings, chamber 51 being normally connected to a source of vacuum such as an inlet manifold of a vehicle through a connection 79 on the front end wall of the booster housing a non-return valve.

FIG. 6 illustrates the parts just after a force has been applied to the input member. On application of a force to the piston 53 by the input member 67 the piston tilts about its rocking engagement with the output member 55 and the abutments 77 until the movable valve member 73 engages the outer valve seating 69 to cut off communication between the chambers on opposite sides of the piston. On further movement of the input member 67 the movable valve member 73 is moved away from the inner valve seating 70 so that atmospheric air is allowed to enter chamber 52 behind the piston from an open-ended rubber boot 80 which surrounds the input member 67 and makes a seal between the piston and an opening in the rear wall of the booster through which the input member 67 passes. The air passes from the boot 80 through the filter 81 and into the annular chamber 78 through a passage 82 in the member 71. From the chamber 78 air is admitted into the chamber 52 through a passage 83 in the piston 53 connecting chamber 78 and chamber 52. The booster is thus energized and the piston applies a force to the output member.

The effective centre of pressure on the piston 53 is on the axis of the booster which in FIG. 6 corresponds to the geometric center of the casing and is effective to return the piston to a plane substantially at right angles to the axis of the booster so that the movable valve member 73 re-engages the inner valve seating 70 and cuts off the rear chamber from atmosphere until the piston 53 is advanced again by the input member 67.

The valve assembly 68 being substantially in radial alignment with the input and output members restrains or prevents relative transverse movement of the valve members and avoids scuffing.

It will be appreciated that as a part of the valve assembly 68 is carried by the piston 53 and part by the output member the piston return spring 76 acts in effect as one of the valve springs.

When atmospheric air is admitted to chamber 52 it passes through a filter 81 positioned in the air inlet adjacent to the valve assembly 68 which is retained between a plate 82 secured to an inclined portion of the rubber boot 80 which is shaped to support as well as retain the filter in position. In operation the input member 67 contacts the filter 81 maintaining it in contact with the portion of the boot and the plate so that it cannot vibrate out of position.

The input member 67 passes through a slot in the plate and as the plate is inclined away from the axis of the input member, inward movement of the input member is relatively free but outward movement is substantially restricted. The slot in the plate 82 may be generally of keyhole shape allowing the plate to be fed over the outer end of the input member during assembly and in the installed position the member passes through the narrow portion of the keyhole slot.

The filter 81 can be simply removed and replaced by the use of a pair of tweezers or the like, without dismantling the plate 82 and/or the input member 67.

Another practical form of the booster illustrated diagrammatically in FIGURE 3 is shown in FIGURES 7–12, and in this construction 100 is a housing or cylinder of the booster which is divided into front and rear chambers 101 and 102 by a movable wall which is free to tilt and which is formed by a rigid piston 103 having a substantial clearance between its peripheral edge and the peripheral wall of the housing to which the piston 103 is connected by a rolling diaphragm 104 forming a seal. In addition to serving as part of the movable wall, a part of the piston also serves as a lever part which operates as a lever, in a manner to be described due to the tilting of the piston as afforded by the rolling diaphragm. The housing 100 is constructed from two co-operating portions between which is trapped the peripheral wall of the rolling diaphragm 104 and which are secured together by an annular clip of channel section. An output member 105 which may be the rod actuating the piston of a master cylinder 106 is guided for axial movement in the front wall 107 of the booster and in the rear wall 108 through a guide 109.

The output member 105 passes through openings in a thrust block 110, piston 103 and a valve plate 111 mounted on the rear face of the piston. A thrust flange 112 on the output member is engaged by the front face of the thrust block 110, and the rear face of the thrust block is engaged by spaced semi-spherical or semi-cylindrical dimples 113 formed in the piston which help restrain the thrust block 110 and the piston 103 against relative angular movement.

The guide 109 through which the output member 105 works is retained in its opening in the rear wall 108 of the housing by an end cover 115 having a recess into which the rear end of the output member projects.

An input member 114 which may be a rod actuated by a pedal, passes through a longitudinal opening 116 in the end cover and a boot 117 surrounds the member and makes a seal between it and the opening 116, the input member at its forward end being located in a seal 118 in the valve plate and having a rocking engagement with the piston 103 to which it is coupled by a clip 119 of U outline. The input member 114 has an axial bore 120 which forms an air inlet for the booster and terminates in lateral passages which communicate with an air inlet valve member 121 through lateral passages 122 in the valve plate (FIGURE 9).

The front chamber 101 is normally connected to a source of vacuum such as an inlet manifold of a vehicle through a connection 123 on the front wall 107 and which houses a non-return valve, and chamber 102 is normally in communication with the front chamber through a vacuum valve member 124 controlling an opening 125 in the piston 103 and in the valve plate 111.

The air inlet valve member 121 and the vacuum valve member 124 are mounted on a valve arm 126 which is generally T shaped, the stems of the valve members being received in notches 127 on opposite sides of the cross piece of the valve arm and retained in the notches by detachable pins 128. The valve arm is pivotally mounted on a cross pin 129 in the output member 105 and a spring 130 located in co-operating recesses in the valve plate 111 and the stem of the valve arm tends to bias the valve members 121 and 124 against their seatings formed in the valve plate.

The piston 103 is loaded by a return spring 131 acting on the thrust block 110 which, in the inoperative position of the booster, holds the rear face of the piston or an abutment plate 132 on the rear face of the piston in engagement with spaced abutments or back stops 133 on the rear wall 108 of the housing and the vacuum valve seating in the valve plate 111 is held away from its valve member 124. Alternatively as shown in FIGURES 11 and 12 abutments carried by the piston can engage with the rear wall of the housing.

As described above both chambers 101 and 102 are in communication with a source of vacuum and the piston 103 assumes the position shown in FIGURE 11 under the influence of the return spring 131. Application of a force to the piston 103 by the input member 114 causes the piston to tilt about its point of engagement with a backstop 133, moving angularly about an axis perpendicular to the axis of the cross pin 129 and carrying with it the valve plate 111. The vacuum valve member 124 is thus urged into engagement with its seating on the valve plate so that communication between the chambers on opposite sides of the piston 103 is cutoff (FIGURE 10). On further movement of the input member 114 the valve plate is tilted further with the piston (FIGURE 12) to move away from the air inlet valve member 121 its seating in the valve plate and simultaneously the vacuum valve mamber 124 is lifted with the valve plate and carries with it the valve arm 126. Since the valve arm cannot move angularly about the axis perpendicular to the axis of the cross pin 129 and the valve arm which moves the air inlet valve member 121 away from its seating. Atmospheric air is then allowed to enter the chamber 102 past the air inlet valve member and the booster is thus energised and the piston 103 applies a force to the output member 105 through the thrust block 110 and the thrust flange 112.

As the separation of the air inlet valve member 121 from its seating in the valve plate 111 is dependent upon the movement of the valve member away from its seating and the simultaneous retraction of the seating from the valve member this effect is dependent upon the degree of articulated movement between the piston 103 and the thrust block 110 which can be controlled by the spacing between the rear face of the thrust block and the forward face of the piston.

Conveniently this is achieved in one example by inclining at a suitable angle away from the piston, the rear face of the thrust block 110 as indicated in FIGURES 7, 11 and 12. Alternatively the rear face of the thrust block can be maintained substantially planar whilst the piston 103 is suitably angled.

In another arrangement either the piston 103 or the block 110 is recessed over its radially innermost portion and has adjacent its outer periphery a boss or bosses which are spaced from the other member by a distance to allow the required degree of articulation.

The effective centre of pressure of the piston 103 is on the axis of the booster so that when the input member 114 is released a couple produced by the return pressure from the master cylinder 106 and the forward pressure of the air differential acts to tilt the piston into the position shown in FIGURE 11. Conversely during operation of the booster as described above the piston 103 will tilt in the opposite direction and assume an "over centre" position when the booster is energised as illustrated in FIGURE 12.

In another embodiment the piston is inclined at a slightly great angle which is chosen so that forward movement of the piston when the booster is energised occurs when the piston is substantially at right angles to the axis of the booster.

Although the cylinder or casing of the booster would be expected to be circular in cross-section, with the consequence that the centre of pressure on the piston is at its geometrical centre and the lines of action of the input and output members are offset, the cylinder or casing could, according to yet another feature of the invention, be made of asymmetrical cross-section, so that the centre of pressure of the piston is offset and consequently the line of action of the input or of the output member can be arranged to be on the geometrical centre line of the casing. Furthermore, if use is made of the offset input and/or output members mentioned above, then the lines of action of both of them could be coincident and through the geometrical centre of the casing.

In the preceding description it has been implied that both the input and output members are in the form of rods, both in tension or both in compression and lying on opposite sides of the movable wall. However, if desired one could be in tension and the other in compression, the points of engagement on the lever or wall being appropriately modified, and they could both lie on the same side of the movable wall.

We claim:

1. A fluid-pressure operated booster comprising a housing defining a power chamber, a pressure responsive wall in the housing dividing the housing into a constant pressure chamber and a variable pressure chamber, said pressure responsive wall being subjected to differential fluid pressures when the booster is energized and being movable in response to such differential fluid pressure, said movable wall including a lever part, said lever part having a first point which is acted upon at the center of pressure of said movable wall, a force output member, a force input member acting on said force output member through said lever part of which said input member acts on said lever part at a second point spaced from said first point, means defining a fulcrum between said output member and said lever part at a third point thereon between said first and second points, and valve means to control development of said pressure differential actuated upon movement of said input member.

2. A fluid-pressure booster as claimed in claim 1, in which the lever is mounted on the movable wall.

3. A fluid-pressure booster as claimed in claim 1, in which the lever is formed by the movable wall itself.

4. A fluid-pressure booster as claimed in claim 1, in which the lever is formed by a part of the movable wall.

5. A fluid-pressure operated booster as claimed in claim 1, wherein said lever is of rigid construction.

6. A fluid-pressure operated booster comprising a housing defining a power chamber and having a peripheral wall, a pressure responsive wall in the housing dividing the housing into a constant pressure chamber and a variable pressure chamber, said pressure responsive wall being subjected to differential fluid pressures when the booster is energised and being movable in the housing in response to such differential fluid pressures, said movable wall forming a lever adapted to tilt in the housing and being formed by a rigid piston having a substantial clearance between its peripheral edge and the peripheral wall of said housing, and a rolling diaphragm connecting said piston and said peripheral wall to form a seal, a force output member, a force input member acting on said force output member through said lever of which said input member acts on said lever at a point spaced from the centre of pressure of said movable wall, means providing a fulcrum between said output member and said lever at a point on the lever located between the point at which the input member acts on the lever and the centre of pressure of the movable wall, and valve means to control development of said pressure differential actuated upon movement of said input member.

7. A fluid-pressure operated booster as claimed in claim 6, wherein the piston of the movable wall has a front face and a rear face, and the output member at its rear end has a rocking engagement with the front face of the piston, and the input member has a rocking engagement with the rear face of the piston at a point spaced radially outwards from the point of engagement of the output member, the two points of engagement being in substantial radial alignment.

8. A fluid-pressure operated booster as claimed in claim 6, wherein said housing has a front wall through which said output member passes, and said front wall includes a first recess to provide a spigot location to receive one end of a master cylinder, a second recess to provide a location for a seal through which the output member works, and a flange to provide a bearing and guide surface for said output member.

9. A fluid-pressure booster as claimed in claim 6, and further including an air inlet adjacent to said valve means, a plate carried by said movable wall, a flexible boot attached at one end to said movable wall and attached at the other end to said housing of said booster, and a filter positioned in said air inlet and retained between said plate and a portion of said rubber boot.

10. A fluid-pressure booster as claimed in claim 9, wherein said movable wall has an inclined portion, a recess in said inclined portion, and said one end of said boot has a thickened portion received in said recess in which it is retained by said plate.

11. A fluid-pressure booster as claimed in claim 6, and further including a fitting at an end of said output member adapted to fulcrum on said movable wall, a transverse pin in said fitting, and two projecting portions carried by said movable wall between which said transverse pin is located.

12. A fluid-pressure operated booster comprising a housing defining a power chamber and having a peripheral wall, a pressure responsive wall in the housing dividing the housing into a constant pressure chamber and a variable pressure chamber, said pressure responsive wall being subjected to differential fluid pressures when the booster is energised and being movable in the housing in response to such differential fluid pressures, said movable wall forming a lever adapted to tilt in the housing and being formed by a rigid piston having a substantial clearance between its peripheral edge and the peripheral wall of said housing, and a rolling diaphragm connecting said piston and said peripheral wall to form a seal, a force output member, a force input member acting on said force output member through said lever of which said input member acts on said lever at a point spaced from the centre of pressure of said movable wall, means providing a fulcrum between said output member and said lever at a point on the lever located between the point at which the input member acts on the lever and the centre of pressure of the movable wall, and valve means to control development of said pressure differential comprising an outer annular valve seating integral with the piston of said movable wall, a lug extending radially and forwardly from said force output member, an inner annular valve seating concentric with said outer seating and carried by said lug, a valve member for engagement with said seatings carried by said lug, a first spring urging said valve member towards said valve seatings and a second spring acting in the opposite direction to load said lug.

13. A fluid-pressure booster as claimed in claim 12, and further including an annular chamber located between said valve seatings to allow communication between said chambers on opposite sides of said movable wall when said lug holds said valve member away from said outer valve seating in the inoperative position of booster.

14. A fluid-pressure booster as claimed in claim 12, wherein said housing has a fixed rear end wall, and a return spring loading said movable wall to urge said movable wall into engagement with said rear end wall of said housing, and abutment means interposed between said rear end wall and said movable wall.

15. A fluid-pressure operated booster comprising a housing defining a power chamber and having a peripheral wall, a pressure responsive wall in the housing dividing the housing into a constant pressure chamber and a variable pressure chamber, said pressure responsive wall being subjected to differential fluid pressures when the booster is energised and being movable in the housing in response to such differential fluid pressures, said movable wall forming a lever adapted to tilt in the housing and being formed by a rigid piston having a substantial clearance between its peripheral edge and the peripheral wall of said housing, and a rolling diaphragm connecting said piston and said peripheral wall to form a seal, a force output member, a force input member acting on said force output member through said lever of which said input member acts on said lever at a point spaced from the centre of pressure of said movable wall, means providing a fulcrum between said output member and said lever at a point on the lever located between the point at which the input member acts on the lever and the centre of pressure of the movable wall, and valve means to control development of said pressure differential comprising a valve plate mounted on the rear face of said movable wall, two separate valve seatings formed in said valve plate, a valve arm mounted on said output member for angular movement about an axis perpendicular to an axis about which said lever is capable of tilting, valve members for engagement with said valve seatings carried by said valve arm, and a spring tending to urge said valve members towards said valve seatings.

16. A fluid-pressure booster as claimed in claim 15, wherein said housing has a fixed rear end wall, and a return spring biases said movable wall into engagement with said rear end wall in the operative position of booster, and abutment means interposed between said rear end wall and said movable wall.

17. A fluid-pressure booster as claimed in claim 16, wherein one of said seatings in said valve plate is held away from the valve member adapted to co-operate with it, and the other valve member is held in engagement with its valve seating when the booster is in the inoperative position.

18. A fluid-pressure operated booster comprising a housing defining a power chamber and having a peripheral wall, a pressure responsive wall in the housing dividing the housing into a constant pressure chamber and a variable pressure chamber, said pressure responsive wall being subjected to differential fluid pressures when the booster is energised and being movable in the housing in response to such differential fluid pressures, said movable wall having a front face and a rear face end forming a lever adapted to tilt in the housing, said movable wall being formed by a rigid piston having a substantial clearance between its peripheral edge and the peripheral wall of said housing, and a rolling diaphragm connecting said piston and said peripheral wall to form a seal, a force output member, a force input member acting on said force output member through said lever of which said input member acts on said lever at a point spaced from the centre of pressure of said movable wall, means providing a fulcrum between said output member and said lever at a point on the lever located between the point at which the input member acts on the lever and the centre of pressure of the movable wall, valve means to control development of said pressure differential comprising a valve plate mounted on the rear face of said movable wall, two separate valve seatings formed in said valve plate, a valve arm mounted on said output member for angular movement about an axis perpendicular to an axis about which said movable wall is capable of tilting, valve members for engagement with said valve seatings carried by said valve arm, a thrust block in articulated engagement with the front face of said movable wall for transmitting force from said movable wall to said output member.

19. A fluid-pressure booster as claimed in claim 18, in which the rear face of the thrust block is angled away from the piston of the movable wall to permit the articulated movement in the direction of tilting of the movable wall.

20. A fluid-pressure booster as claimed in claim 18, in which the input member has an axial bore communicating with one of the valve members through a passage in the valve plate and through which air can be admitted to energise the booster.

References Cited by the Examiner

UNITED STATES PATENTS

| | | | |
|---|---|---|---|
| 2,229,247 | 1/1941 | Kamenarovic | 91—376 |
| 2,457,721 | 12/1948 | Price | 91—369 |
| 3,026,853 | 3/1962 | Stelzer | 91—369 |
| 3,183,789 | 5/1965 | Stelzer | 91—369 |

MARTIN P. SCHWADRON, *Primary Examiner.*

SAMUEL LEVINE, *Examiner.*

P. E. MASLOUSKY, *Assistant Examiner.*